July 21, 1970 W. L. OATES 3,521,128

MICROMINIATURE ELECTRICAL COMPONENT HAVING INTEGRAL INDEXING MEANS

Filed Aug. 2, 1967 4 Sheets-Sheet 1

INVENTOR
William L. Oates

BY [signature]

ATTORNEY

INVENTOR
William L. Oates
BY [signature]
ATTORNEY

INVENTOR
William L. Oates
BY [signature]
ATTORNEY

INVENTOR
William L. Oates

BY [signature]
ATTORNEY 3,521,128

MICROMINIATURE ELECTRICAL COMPONENT HAVING INTEGRAL INDEXING MEANS

William L. Oates, Bernardsville, N.J., assignor to RCA Corporation, a corporation of Delaware Filed Aug. 2, 1967, Ser. No. 657,929

Int. Cl. H05k *1/14, 3/32*

U.S. Cl. 317—101 22 Claims

ABSTRACT OF THE DISCLOSURE

The circuit component comprises a semiconductor die having active elements formed therein and a number of terminal pads disposed around the periphery of the die, and a tapered peg bonded to and extending from the central portion of the die. The base portion of the peg is noncircular in cross section, the peg cross section bearing a fixed alignment to the terminal pads on the die.

BACKGROUND OF THE INVENTION

This invention relates to the field of microminiature electrical components, and more particularly to integral indexing means for such components, processes for providing such indexing means, and processes for automatically assembling such components to associated circuitry.

In the manufacture of semiconductor devices, and integrated circuits in particular, the fabrication of the active semiconductor element(s) represents a relatively small proportion of the manufacturing cost of the packaged device. By far, the largest cost factor is the expense of assembling the active semiconductor element (or elements) into a suitable package of dimensions large enough to be handled by conventional manufacturing techniques. The most expensive step in packaging the semiconductor element is that of providing electrical interconnections between electrodes on the semiconductor body and the external terminal leads of the packaged device.

The microminiature packaging techniques now employed result in unnecessarily large devices in which the active element occupies a very small proportion (often less than 1%) of the total volume of the package. In order to (i) increase component packing density, (ii) provide improved reliability by reducing the number of electrical connections required, and (iii) reduce assembly costs, a great deal of effort has recently been devoted to the development of semiconductor devices which do not require conventional packaging.

These unpackaged devices are colloquially referred to as "flip chip" (in the case of a unitary active element) or "hybrid" (in the case of a composite circuit including a unitary active element and at least one coupled passive element) components, and generally take the form of a die of semiconductor material having one or more active semiconductor elements formed therein, with a number of terminal pads on the die which are adapted for bonding to corresponding contact areas on a printed circuit or thin film substrate. Often, these terminal pads take the form of raised solderable (or otherwise bondable) contacts of the general type shown, e.g., in U.S. Pat. No. 3,292,240.

A major difficulty in utilizing these so-called "flip chip" components is that their extremely small size makes them difficult to adapt to mass production assembly methods. In particular, it has proven extremely expensive to manually position each such component on a printed circuit substrate in such a manner that the extremely small terminal pads on the component register with sufficient accuracy with the underlying contact areas on the substrate.

In addition, the individual components are generally manufactured in lots of several hundred from a single semiconductor slice, the slice being subsequently subdivided. After separation, the individual components are collected in a hopper, from which they must be subsequently removed, sorted and oriented at additional cost.

Another difficulty inherent in the "flip chip" or hybrid techniques heretofore known is that testing must be carried out while the components are an integral part of the master semiconductor slice, so that the testing conditions do not accurately reflect the performance results obtained when the individual components are isolated from each other.

It is therefore evident that the general acceptance of directly mountable unpackaged semiconductor components has not yet been achieved, primarily because the art of handling and electrically connecting a single microminiature component directly to an associated circuit network without the use of an intermediate package has not yet been economically reduced to practice.

An object of the present invention is to provide a directly mountable semiconductor device which is readily adaptable to testing, handling and assembly to an associated circuit network by economical mass production methods.

SUMMARY OF THE INVENTION

According to the invention, there is provided a microminiature electrical component having integral indexing means. The component comprises a die containing at least one active element, the die having a number of terminal pads situated on at least one surface thereof for electrical connection to external circuitry. A protuberance having a base portion accurately aligned with the terminal pads extends from one major surface of the die.

I prefer to manufacture the indexed component of my invention by (i) providing a slice of semiconductor material having a large number of circuits integrally formed therein in accordance with a coordinate grid pattern, (ii) providing a corresponding number of protuberances spaced to register with the circuit, and (iii) simultaneously bonding the base portion of each protuberance to the surface of the corresponding circuit (later to be separated into an individual die) so that the base portion of each such protuberance is accurately aligned with the terminal pads of the corresponding circuit.

IN THE DRAWING

Figures 1, 1A, 2A, 2B, 2C, 2D, 2E:
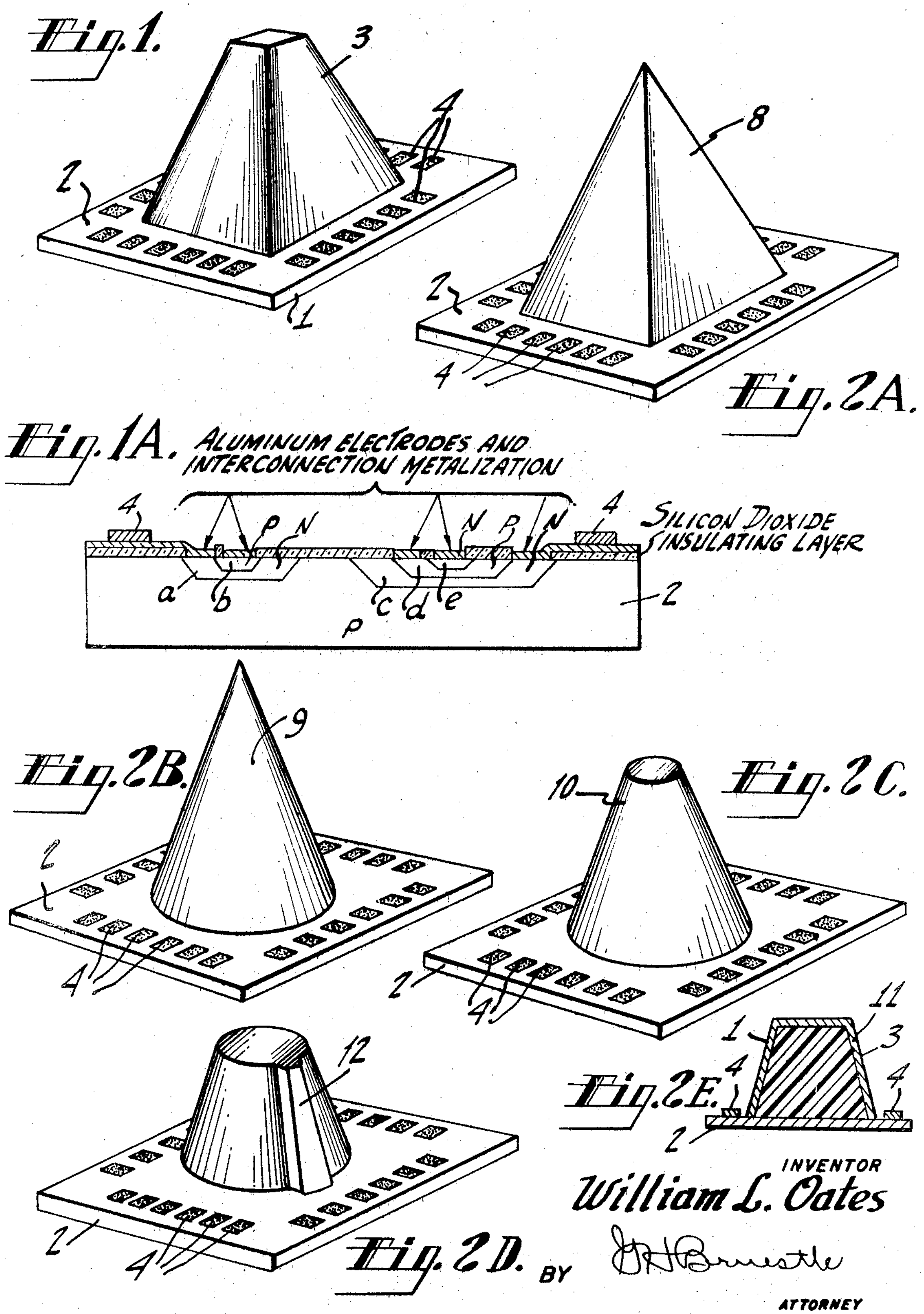
FIGS. 1 and 1A show a semiconductor device according to a preferred embodiment of the invention.
FIGS. 2A–2E show various semiconductor devices according to alternative embodiments of the invention.
Figure 4:
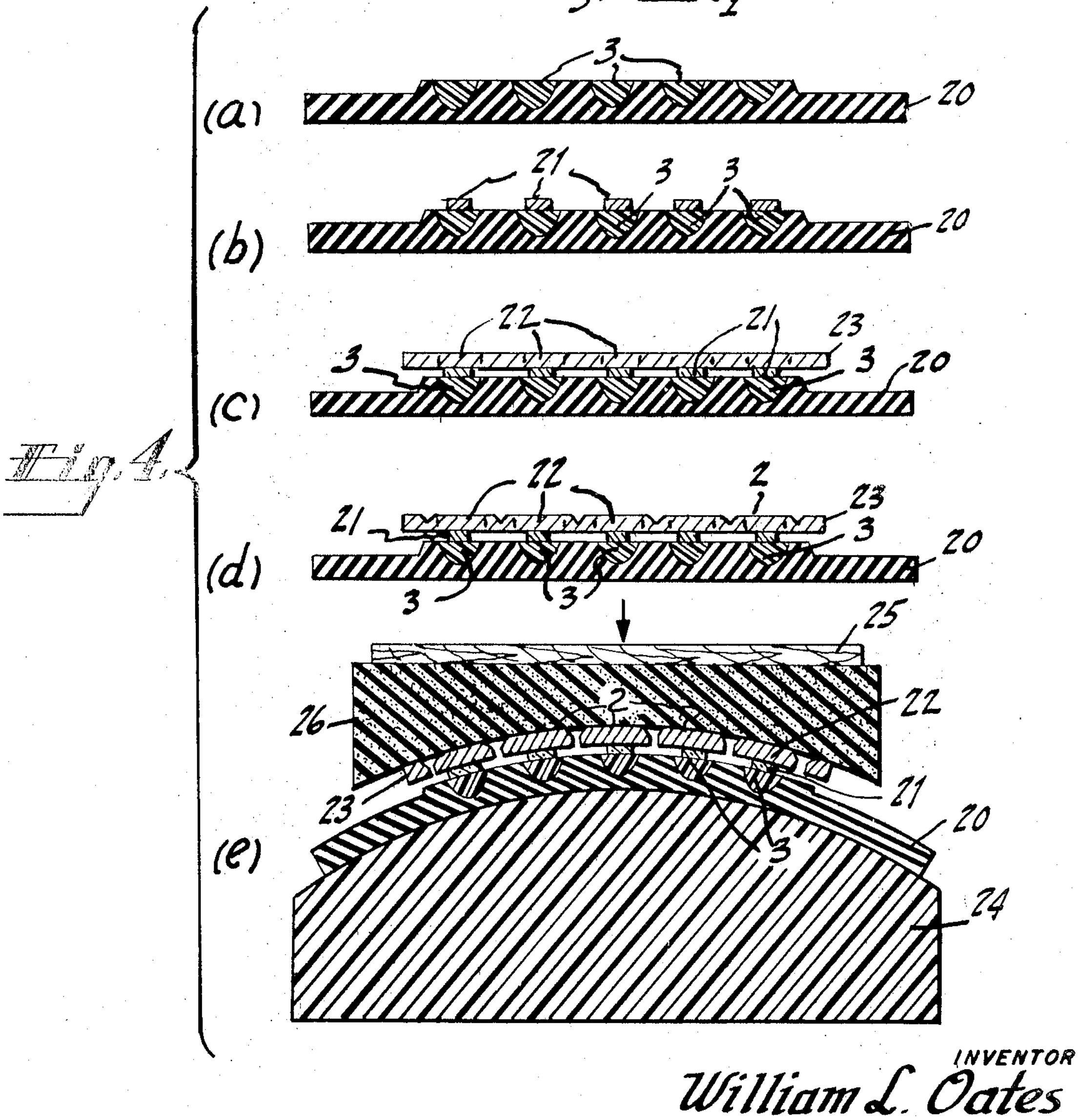
Figure 5:
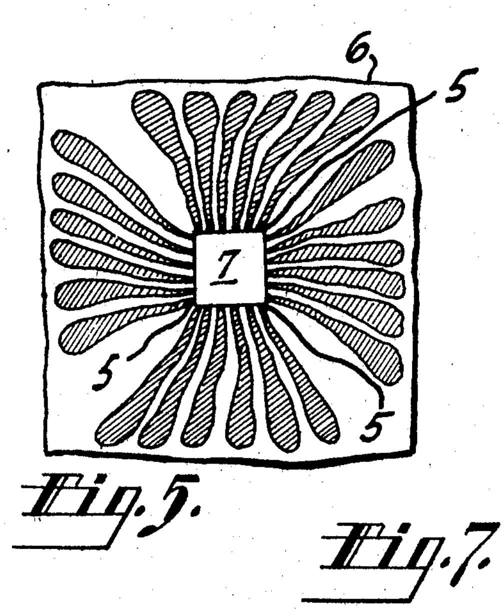
Figure 6:
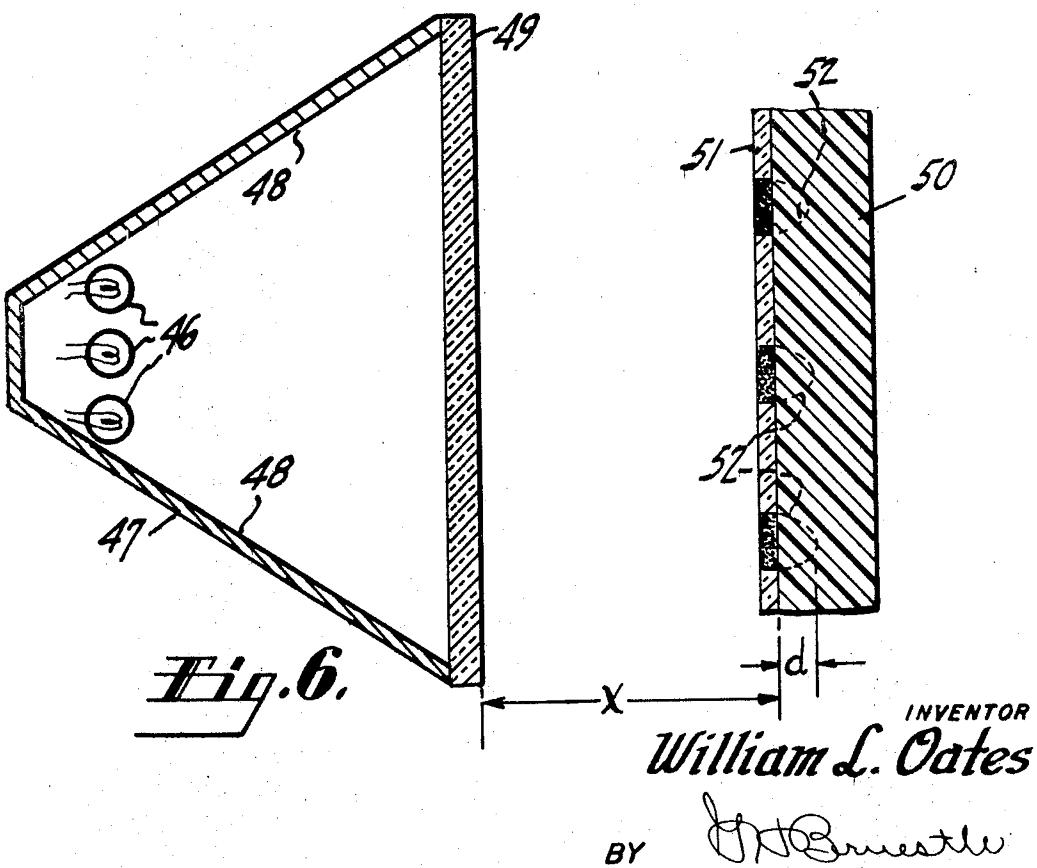
Figures 8, 9A:
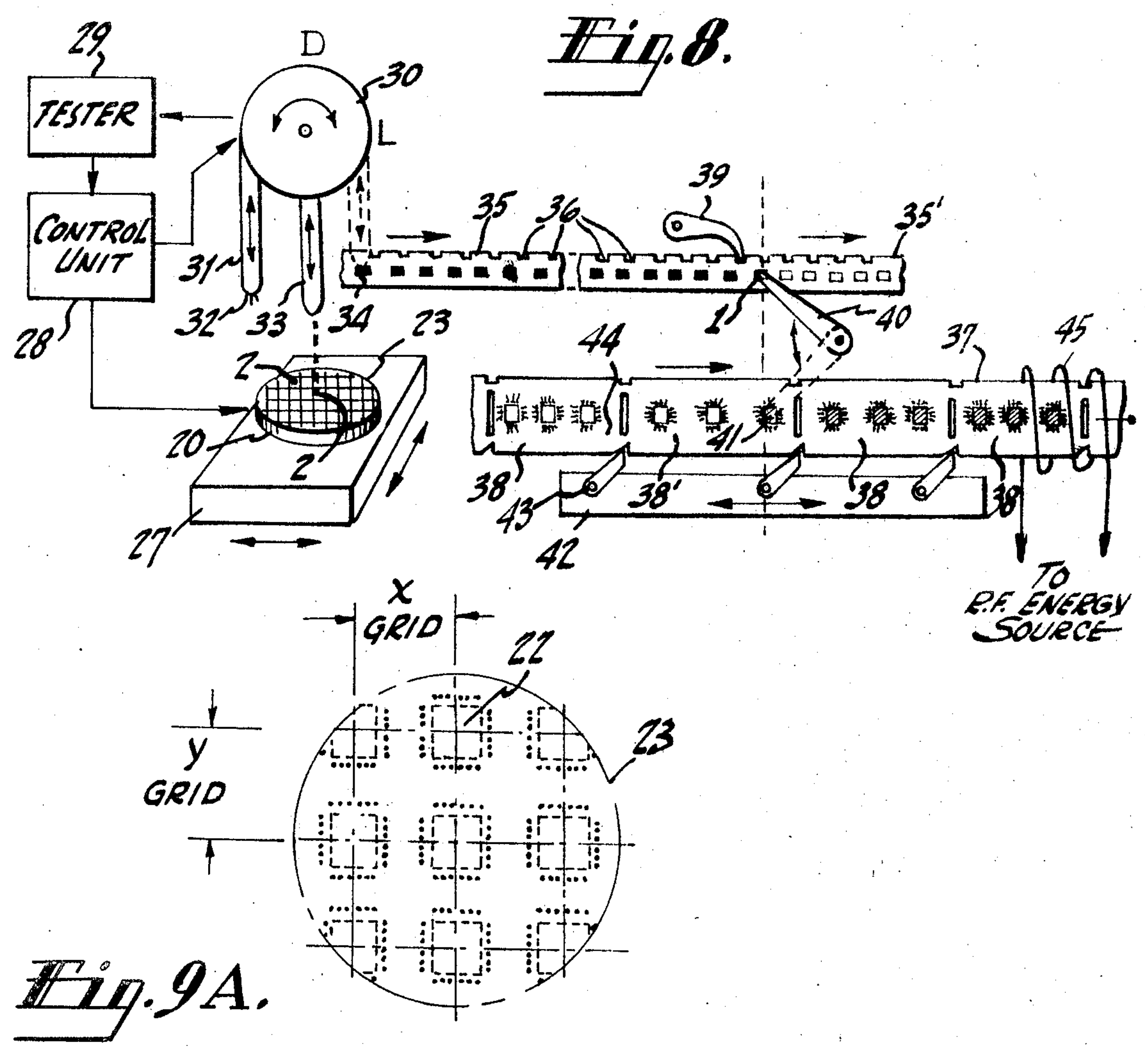
Figure 9B:
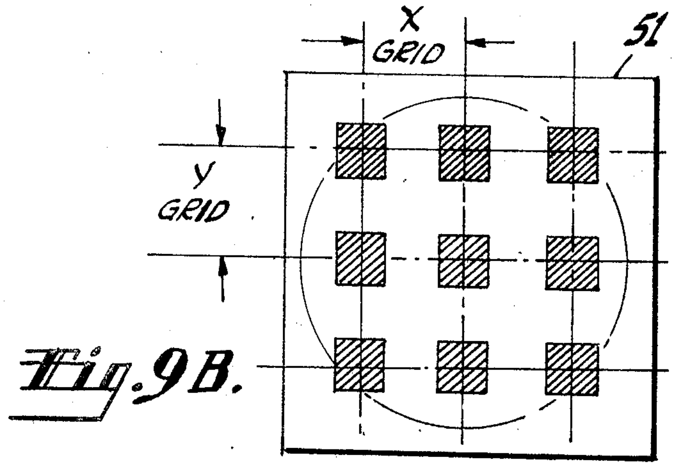

FIGS. 4(*a*)–4(*e*) show the major steps involved in fabricating a semiconductor device according to the invention;

FIG. 5 shows a printed circuit substrate suitable for receiving the device of FIG. 1;

FIG. 6 shows apparatus employed in manufacturing a flexible mold used in making the device of the invention;

FIGS. 7(a)–7(d) show additional steps utilized in manufacturing the aforementioned mold;

FIG. 8 shows, in stylized fashion, apparatus employed for testing, sorting and mounting devices manufactured according to the invention; and FIG. 9 shows part of a semiconductor slice (FIG. 9A) and a photomask (FIG. 9B) useful in explaining the process for making the semiconductor devices of the invention.

DETAILED DESCRIPTION

FIG. 1 shows a semiconductor device 1 according to a preferred embodiment of my invention.

The device 1 comprises a die 2 containing one or more active semiconductor elements. Disposed about the periphery of the upper surface of the die 2 are a number of metallic terminal pads 4 each of which may be connected to a corresponding region of the semiconductor element (or elements) formed in the die 2.

The die 2 may be monolithic, housing either an individual semiconductor element or a monolithic integrated circuit. Such a structure is shown in cross section in FIG. 1A, in which the die 2 comprises a semiconductor material such as silicon and contains a planar diode formed by adjacent operating regions *a* and *b*, and a planar transistor formed by adjacent operating regions *c*, *d* and *e*. Each of the operating regions is contacted by an aluminum electrode through a corresponding aperture in the silicon dioxide insulating layer which is disposed on the die surface. An aluminum metallization pattern on the insulating layer electrically connects each operating region to a corresponding terminal pad.

Alternatively, the die 2 may be of insulating material containing a number of isolated semiconductor elements as shown, e.g., in U.S. Pat. No. 3,300,832. Another possible structure for the die 2 is that of a number of active semiconductor elements interconnected by metallic bridges, as shown in U.S. Pat. No. 3,307,239. It should be understood that the die 2 utilized in the device of FIG. 1 may take any of these forms, or other forms, it being necessary only that the die 2 contain at least one active element having regions connected to respective ones of the terminal pads 4.

Extending from and bonded to the central portion of the upper surface of the die 2 is a tapered peg 3. While the peg 3 need not necessarily be tapered, I prefer to provide a tapered geometry for the peg in order to facilitate alignment of the device 1 with a printed circuit substrate, as will hereinafter be described.

Referring to FIG. 1, it will be appreciated that the truncated pyramidal form of the peg 3 is useful as an aligning and indexing element for the die 2 and its associated terminal pads 4. The device 1 may, e.g. be mounted to a printed circuit substrate having a square hole contoured to mesh with the square base of the (truncated) pyramidal peg 3.

A printed circuit substrate having a suitable metallized pattern for this purpose is shown in FIG. 5. It is evident that if (i) the base of the peg 3 is accurately aligned with the terminal pads 4 of the die 2, and if (ii) each of the contact areas 5 of the printed circuit substrate 6 is accurately aligned with the square hole 7 therein, then upon bringing the device 1 adjacent the substrate 6 so that the peg 3 engages the hole 7, there will be insured an accurate registration between each of the die terminal pads 4 and the corresponding substrate contact areas 5. Either the terminal pads 4 or the contact areas 5, or both, may be solder coated to facilitate bonding by a simple heating (to soldering temperature) step. Alternatively, the terminal pads and contact areas may be coated with metal alloys having different eutectic temperatures, and bonded together by heat treatment in the manner described in U.S. Pat. No. 3,292,240.

In all cases the peg insures proper alignment of the die terminal pads without reference to the die edges, which may be quite irregular. Accurate cutting during separation of the wafer into the many chips or dice is therefore no longer critical.

If automatic machinery is used to position the device 1 adjacent the substrate 6, the machinery need only accomplish this positioning with sufficient accuracy to start the peg 3 in the hole 7. The tapered non-circular geometry of the peg 3 will thereafter insure that upon bringing the wafer and substrate together the terminal pads 4 and contact areas 5 will be accurately aligned.

It will be appreciated that the peg 3 may have other than a truncated prismatic geometry, it being necessary only for the base portion of the peg to be non-circular to insure accurate indexing with a substrate or template with respect to which the device 1 is to be aligned.

FIGS. 2A through 2D illustrate alternative forms for the geometry of the peg 3, but are by no means to be considered as limiting the scope of the invention. FIG. 2A shows a peg 8 having a pyramidal shape. FIG. 2B shows a peg 9 in the shape of a cone having elliptical cross section, and FIG. 2C shows a peg 10 with an ellipsoidal frusto-conical shape. FIG. 2D shows a peg 12 having a tapered "key-hole" construction.

While the material which comprises the peg 3 is not critical, it being only necessary that the material be capable of being manufactured in the desired shape and of being bonded to the die 2, it is in most cases highly desirable to employ a material which exhibits good thermal conductivity. In some cases, it may be desirable to form the peg 3 of a magnetic material in order to facilitate handling of the device by electromagnetic pick-up techniques, or to provide a high permeability base for various types of inductive circuitry formed on the die 2.

In another form, the peg 3 may be made of a suitable metal in order to serve as a heat sink coupler for the elements formed in the die 2. When this is done, the metal peg 3 is preferably made solderable in order to facilitate the bonding of a suitable heat sink to the peg.

In order to facilitate the heating (by radio frequency induction techniques) of the die 2 to bond the terminal pads 4 to corresponding contact areas of a printed circuit or thin film substrate, the peg 3 (when made of insulating material) may be provided with a metallic coating 11, as shown in FIG. 2E. The metallic coating 11 may be applied by sputtering or electroless plating techniques well known in the art.

In some cases it may be desirable to remove the peg 3 from the die 2 after the die has been secured to its associated circuitry. For accomplishing this purpose, the peg 3 may be secured to the die 2 by means of an adhesive (such as, e.g. a Butvar resin, manufactured by Showinigan Resin Company, Springfield, Mass.) which is readily soluble in a solvent (such as ethyl alcohol or water for the aforementioned adhesive) which does not attack the die 2. Alternatively, the peg 3 may be made of a material which is itself soluble in such a solvent, or may comprise a low melting point substance (such as styrene or apiezon wax, or a low melting point metal such as lead, tin, a lead-tin alloy, Lows metal or Wood's metal), so that the peg 3 dissolves when the die 2 is heated to solder the terminal pads 4 to the corresponding contact areas of the associated printed circuit or thin film substrate.

Figure 3A:
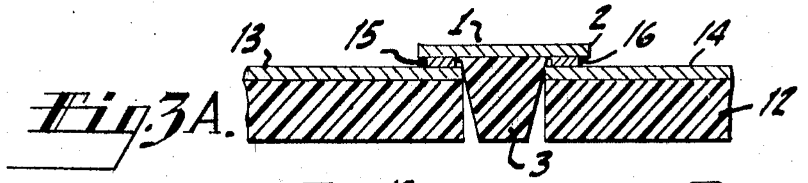
FIGS. 3A and 3B illustrate the technique of mounting the semiconductor device of the invention to a printed circuit substrate.
Figure 3B:
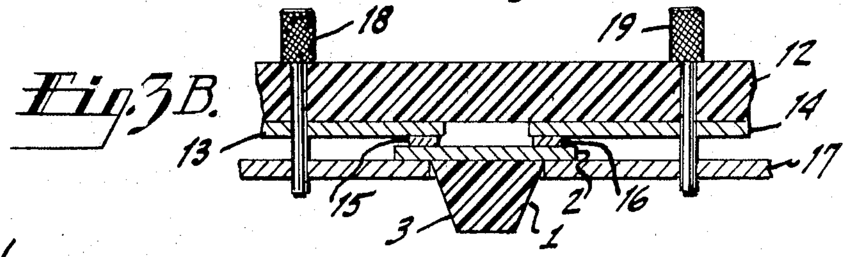

FIGS. 3A and 3B illustrate in somewhat more detail the manner in which the device 1 may be indexedly mounted to, e.g., a printed circuit substrate. In FIG. 3A there is shown a printed circuit substrate comprising an insulating base layer 12 and an overlying adherent metallic film having conductive portions 13 and 14 arranged to make electrical contact with terminal pads 15 and 16 of die 2 respectively. Proper registration of the terminal pads 15 and 16 to the respective metallic layer portions 13 and 14 is insured (without regard to the edges of the die 2) by providing the printed circuit substrate with a hole having a square cross section matching that of the base portion of the peg 3. In this case it is evident that the peg 3 should be on the same side of the die 2 as the terminal pads 15 and 16.

In cases where the substrate has multiple overlying conductive layers or where the substrate material is difficult to machine, it is not practical to provide a matching hole in the substrate. The technique for insuring proper registration of the terminal pads 15 and 16 to the corresponding metallic layer portions 13 and 14 in this case is illustrated in FIG. 3B.

It is seen that the semiconductor device 1 of FIG. 3B has the peg 3 disposed on the opposite surface of the die 2 from the terminal pads 15 and 16. A template 17 is provided with a hole matching the base portion of the peg 3, and the semiconductor device 1 is mounted on the template 17 so that the peg 3 accurately indexes the device with the template.

The printed circuit substrate is inverted and placed adjacent the template 17 so that the printed circuit layer portions 13 and 14 contact the die terminal pads 15 and 16 respectively. Accurate registration between the template 17 (with which the device 1 is already in alignment) and the printed circuit layer portions 13 and 14 is insured by means of locating pins 18 and 19 which extend through aligned holes in the printed circuit substrate and the template 17.

After bonding the terminal pads 15 and 16 to the layer portions 13 and 14, the locating pins 18 and 19 and the template 17 are removed. It may in this case be desirable to also remove the peg 3, in the manner previously described.

While it is possible that other techniques may be utilized for attaching the peg 3 to the die 2 so that the non-circular cross section of the peg base is accurately aligned with the die terminal pads 4, I prefer to employ the technique which is illustrated in FIG. 4.

My preferred technique is based upon the manufacture of the semiconductor die 2 as an integral part of a relatively large slice or wafer of semiconductor material having formed therein a large number of circuits, each circuit corresponding to a particular wafer portion 2. It is essential that each of the circuits on the semiconductor slice be precisely located according to a predetermined coordinate grid pattern, as illustrated in FIG. 9A.

By the process to be hereinafter described, I fabricate a flexible silicone rubber mold 20 having a number of apertures therein, each aperture being adapted to receive one of the pegs 3. Each of the apertures is positioned in accordance with the same coordinate grid pattern as is utilized for positioning of the circuits on the semiconductor slice.

After providing the flexible mold 20, the next step is to place one of the pegs 3 in each aperture of the mold. This step may be accomplished either by (i) independently fabricating the pegs 3, spreading the pegs 3 over the mold 20 in random fashion, and vibrating the mold in order to properly settle the pegs 3 in the mold apertures, or (ii) forming the pegs 3 directly in the mold 20.

I prefer to employ the latter technique, and to do so by pouring a curable epoxy resin material (such as, e.g., Stycast No. 2651–40, manufactured by Emerson & Cumming) over the mold 20 to fill all the mold apertures. The uncured epoxy is then "doctored," to provide pegs level with the upper surface of the mold and to prevent the formation of any flash which might subsequently obscure the terminal pads of the dice to which the pegs are to be attached, by gently scraping the upper surface of the mold 20 with a suitable blade. After doctoring, the epoxy pegs 3 are allowed to cure at room temperature for a period on the order of 24 hours.

The resultant mold 20 containing the cured epoxy pegs 3 is shown at A in FIG. 4. The next step is to provide a thin layer of adhesive on each of the epoxy pegs 3, being careful that the adhesive does not extend beyond any peg to adhere to the surface of the mold 20. The adhesive "spots" 21 (comprising, e.g. the aforementioned Stycast No. 2651–40) are preferably deposited through a mask having apertures disposed in accordance with the coordinate grid pattern utilized for positioning of the pegs 3 in the mold 20, as well as for positioning of the device circuits 22 on the semiconductor slice 23 (FIG. 9A).

After the adhesive spots 21 have been positioned on the hardened pegs 3 as shown at B in FIG. 4, the semiconductor slice 23 is brought adjacent the flexible mold 20 and the hardened pegs 3 so that each of the device circuits 22 is bonded to a corresponding peg 3 in a predetermined alignment.

Proper registration of the pegs 3 to the device circuits 22 is achieved merely by aligning the coordinate pattern of the mold 20 with the coordinate pattern of the slice 23. This alignment may be accomplished with the use of a standard alignment table of the type commonly used for providing proper registration between integrated circuit substrates and photomasks.

The resultant structure at this point is shown at C in FIG. 4.

The next step involves subdivision of the master slice 23 in order to divide the slice into a number of dice 2, each containing one of the device circuits 22. While a number of severing techniques may be employed for this purpose, I prefer to scribe the slice (in accordance with the aforementioned coordinate pattern), and to subsequently flex the slice to cause separation of the individual dice.

The slice may be scribed while it is retained in place by virtue of the hardened pegs 3 being disposed in the apertures of the flexible mold 22. Alternatively, the slice-peg assembly shown in FIG. 4*c* may be transferred to a relatively hard mold (having the same aperture pattern as the flexible mold 20) for the scribing operation. The resultant scribed wafer is shown at *d* in FIG. 4.

In order to break the scribed slice or wafer into the individual dice 2, the arrangement shown in FIG. 4*e* is employed. The composite structure is placed on a slightly curved hard spherical form 24 and a pressure tool comprising a wooden plate 25 and a foam rubber pad 26 is employed to apply pressure to the master slice 23. As the slice 23 bends to conform to the curved surface of the spherical form 24, the slice breaks into the individual dice 2. The flexible mold 20, however, retains the individual dice 2 in accordance with the aforementioned coordinate pattern by means of the pegs 3 which remain disposed in the apertures of the flexible mold 20.

It will be appreciated that the mold 20 is required to be flexible only for the purpose of accomplishing the wafer breaking step shown in FIG. 4*e*. Therefore, if alternative dicing techniques such as ultrasonic cutting, centrifugal abrasion or ganged diamond wheel cutting are employed, the mold 20 may comprise a relatively hard material and need not be flexible. As previously stated, the dicing operation is not critical, since the peg 3, not the die edges, is the indexing reference.

After completion of the process described above and shown in FIG. 4, the resultant structure comprises a number of electrically isolated semiconductor devices 1 retained in the aforementioned coordinate pattern by virtue of the bonded pegs 3 being disposed in the apertures of the mold 20. It is therefore evident that the resultant structure, being still disposed in accordance with the original coordinate pattern, may be placed on a conventional X–Y coordinate table (such as, e.g. that manufactured by Transistor Automation Corporation, Massachusetts) and each die may be automatically probed and tested without the inaccuracies which would result if the individual circuits were tested while still an integral part of the master wafer 23.

Moreover, it is now possible after testing each die 2 independently, to employ a vacuum chuck or other suitable transfer means to discard defective dice and to transfer satisfactory dice either to (i) a suitable storage container or (ii) directly to a printed circuit or thin film assembly.

Suitable apparatus for sequentially testing, storing and/or assembling the semiconductor devices of my invention is shown in stylized form in FIG. 8. The diced master wafer 23, having individual dice 2 retained in the original coordinate grid pattern by virtue of the disposition of the bonded (to their corresponding dice) pegs 3 in the apertures of the flexible mold 20 (or an identical relatively hard mold), is placed on a numerically controllable X–Y coordinate table 27.

Under the influence of a control unit 28 and a testing unit 29, the turret 30 is rotated so that the (vertically movable) probe 31 is disposed above a precise initial grid location on the table. The control unit 28 then initiates downward movement of the probe 31 so that the fingers 32 of the probe contact corresponding terminal pads of one of the dice 2 of the master slice 23.

After the electrical characteristics of the die being tested have been evaluated by the tester 29, the tester 29 sends a signal to the control unit 28 indicating whether the die tested is electrically satisfactory or defective. This information, together with the coordinate grid location of the tested die, is stored by the control unit 28 for later use.

After all the dice 2 of the diced master wafer 23 have been so tested, a sorting operation is initiated under supervision of the control unit 28. This sorting operation is commenced by rotating the turret 30 so that the (vertically movable) vacuum chuck 33 is positioned above a selected one of the dice 2. Upon command of the control unit 28, the vacuum chuck 33 moves down to pick up the underlying die 2.

Depending upon the information stored in the control unit 28 as to the tested condition of the selected die 2, the turret 30 is rotated to place the vacuum chuck 33 at the loading position L (if the information stored in the control unit 28 indicates that the selected die is satisfactory) or at the discard position D (if the information stored in the control unit 28 indicates that the particular die 2 selected is defective).

If the die is defective (as indicated by the information stored in control unit 28), it is released by the vacuum chuck into a discard hopper located at the discard position D.

If the die is satisfactory, it is lowered by the vacuum chuck 33 into a square hole 34 of the storage belt 35. The peg 3 of the selected die 2 insures proper seating of the selected die in the square hole 34.

After sorting and either (i) loading each die (if satisfactory) into the belt 35 or (ii) discarding the die (if defective) at the discard position D, the X–Y coordinate table 27 is indexed to place the next die under the vacuum chuck 33 and the sorting operation is continued in this manner until all the dice of the master slice 23 have been sorted.

The dice which have been tested and proven satisfactory are now seated over the square holes of the belt 35, and indexed with the edges of the belt. The belt 35 may be utilized as a container for the tested devices, or may be directly employed to automatically assemble the devices to a printed circuit or thin film substrate. In the apparatus of FIG. 8, there is shown equipment for automatically assembling devices mounted on the belt 35 to a printed circuit substrate.

A portion of the belt 35, shown as 35′, is moved in a selected direction (toward the right in FIG. 8) by properly aligned sprocket wheels (not shown) which index with the sprocket holes 36 of the belt portion 35′. A second belt 37 comprising a continuous array of interconnected flexible printed circuits 38, is moved in a direction parallel to the motion of the belt portion 35′.

As each device 1 approaches the transfer position shown by the dashed line in FIG. 8, the belt 35′ stops momentarily in a position fixed by the cooperation of the indexing lever 39 and a corresponding one of the sprocket holes 36 of the belt portion 35′. As soon as the belt portion 35′ stops (momentarily) in this manner, the device 1 is picked up by the vacuum transfer arm 40 and moved to a position (parallel to its initial position) directly above a corresponding square hole 41 of the particular printed circuit 38′ upon which the device 1 is to be mounted. The square hole 41 has been accurately positioned with respect to the vacuum transfer arm 40 by means of ratchet bar 42 which contains a number of ratchet pawls 43, each of the pawls indexing with a corresponding notch 44 between adjacent ones of the printed circuits 38.

After positioning the device 1 directly above the corresponding square hole 41 of the particular printed circuit 38′, the vacuum transfer arm 40 releases the device 1 so that the peg 3 (see FIG. 1) of the device drops into the square hole 41 to accurately index the terminal pads 4 (see FIG. 1) with the corresponding contact areas of the printed circuit 38′ adjacent the periphery of the hole 41.

The devices according to my invention are sequentially assembled to a corresponding printed circuit board in the foregoing manner. It should be understood that with proper programming of the control apparatus, different types of semiconductor devices may be sequentially mounted to the printed circuits 38 with the equipment shown in FIG. 8, it being only necessary that the belt portion 35′ be properly loaded with the required devices.

After each device has been positioned (by means of the device peg) in the corresponding hole of the printed circuit substrate so that the terminal pads of the device are in registration with the underlying contact areas of the substrate, the terminal pads are bonded to their respective contact areas when the printed circuit passes through the radio frequency induction heating coil 45. For use with this induction heating method, the pegs 3 of the device 1 consist of metal or of a metal-coated insulating material, as shown in FIG. 2E.

The heat induced in the pegs 3 by means of the radio frequency induction heating coil 45 is conducted to the terminal pads of the wafer to reflow the solder on the pads, so that the pads become permanently bonded to the corresponding underlying contact areas of the printed circuit. Alternatively, the printed circuits may be passed through a continuous open-ended furnace in order to perform the aforementioned soldering operation.

Figure 7:
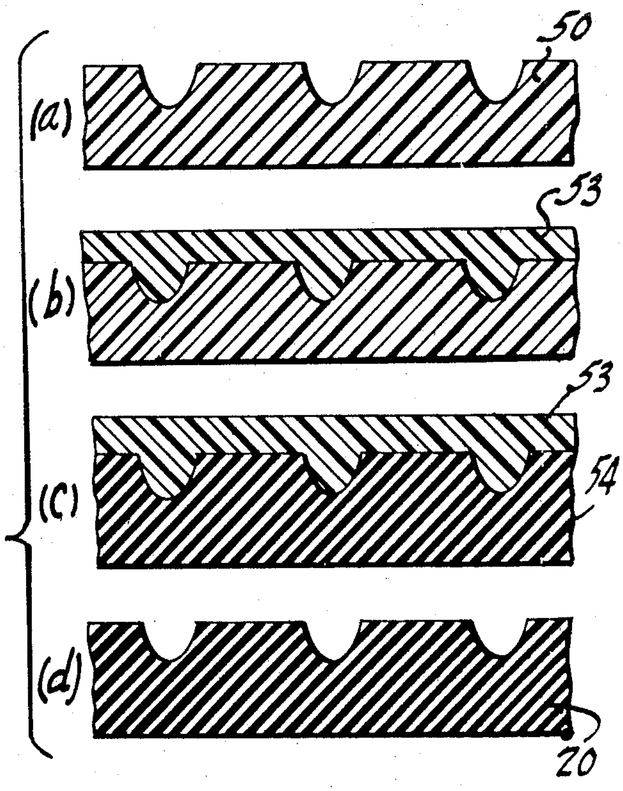

The manner in which the flexible mold 20 is made will be best understood by reference to FIGS. 6, 7, and 9.

Shown in FIG. 6 is a diffused light source comprising one or more point or line sources of light 46 contained in a suitable box 47 having reflective inner surfaces 48. A translucent screen 49 covers the open end of the box 47 so that the light source 46 in conjunction with the reflective surfaces 48 causes illumination of the screen 49, the illumination being diffused by the screen to provide substantially uniform radiation of light from the screen surface.

Spaced from the screen 49 a predetermined distance X is a photosensitive sheet 50. The material of the sheet 50 is preferably a photosensitive polymeric material sold under the trade name Templex by E. I. Du Pont Company. Alternatively, a polyamide photosensitive material such as that described in U.S. Pat. No. 3,081,168 may be employed. Transparent mask 51, having opaque areas corresponding to the desired positions of the apertures to be formed in the sheet 50 is positioned between the exposed surface of the sheet 50 and the diffused light screen 49.

The mask 51 is manufactured so that each of the opaque areas occupies a coordinate position corresponding to that of one of the circuits 22 formed in the master slice 23, as shown in FIG. 9. FIG. 9A shows a small portion of the master slice 23 containing a number of devices 22 formed therein. FIG. 9B shows a corresponding portion of the mask 51, in which it is seen that each opaque area of the mask is disposed in accordance with a coordinate grid pattern corresponding to the pattern employed for positioning of the active circuits 22.

Again referring to FIG. 6, light from the diffused screen 49 illuminates all but those portions of the photosensitive sheet 50 protected by the opaque areas of the screen 51. Since the material of the screen 50 is translucent, light from the screen 49 irradiates all the material of the screen 50 except that within the truncated pyramid-shaped regions 52 corresponding to the desired apertures to be formed.

The taper as well as the depth $d$ of these non-irradiated regions 52 depends upon the distance X as well as the effective size of the screen 49. With the Templex material and the apparatus of FIG. 6, apertures with a depth $d$ on the order of .040 inch can be readily fabricated. The exact taper is not critical, so long as the base dimensions of each aperture are maintained constant.

The portion of the photosensitive sheet 50 which has been irradiated becomes hardened to a particular solvent (dilute sodium hydroxide for the Templex material) while the regions 52 which have not been irradiated are dissolved by the solvent. After immersion of the exposed sheet 50 in this solvent, the resultant structure is as shown at (*a*) in FIG. 7.

It is now necessary to transfer the pattern shown at (*a*) to a flexible medium. The first step in the transfer is to produce a "negative" mold 53 of relatively hard epoxy material. The mold 53 has protuberances which correspond to the apertures of the developed sheet 50 shown in FIG. 7(*a*). The "negative" mold 53 is then used to impress the desired pattern upon an uncured silicone rubber base 54 as shown in FIG. 7(*c*). After the silicone rubber (which may be, e.g. Dow Corning Sylgard No. 185) has been cured (by allowing to stand at room temperature for a period on the order of a few hours for the aforementioned rubber), the epoxy "negative" mold 53 is removed, the resultant silicone rubber flexible mold 20 being as shown in FIG. 7(*d*). I prefer to employ Stycast 2651–40 as the material for the "negative" mold 53 (this material being cured at room temperature for a period on the order of 24 hours).

While I have shown the manner in which a semiconductor device having a (truncated) pyramidal indexing peg of square base cross section may be manufactured and automatically tested and assembled to a printed circuit substrate, it will be apparent to those skilled in the art that a great many variations of my invention are possible without departing from the spirit thereof. For example, in the case of relatively large dice it may be desirable to provide more than one peg on each die. The base cross section of each peg could be selected so that the peg could only fit into a substrate hole in only one particular position. The peg could be constructed of special materials to suit particular applications.

While I have shown handling of the assembled semiconductor devices by means of vacuum chucks, other handling means could be used. For example, a magnetic pick-up could be employed in the case where the peg comprises a magnetic material.

What is claimed is:

1. An electrical component, comprising:

a die having at least one operating region, said die having a number of terminal pads on at least one major surface thereof, each of said terminal pads being electrically connected to a corresponding region; and an indexing peg having a base portion of generally non-circular cross-section and an end portion extending outwardly from a selected major surface of the die, the height of said indexing peg between said base end portions being substantially greater than the thickness of said die, said base portion being bonded to said die so that said cross-section has a predetermined geometric alignment with said terminal pads.

2. A component according to claim 1, wherein said at least one region comprises a semiconductor material.

3. A component according to claim 2, wherein said die is monolithic.

4. A component according to claim 1, wherein said end portion is tapered, said indexing peg is centrally disposed on said die, and said terminal pads are peripherally disposed on the die.

5. A component according to claim 1, wherein said end portion is tapered and said indexing peg extends from said one major surface.

6. An electrical component according to claim 1, wherein said indexing peg is centrally disposed on said one major surface, and said terminal pads are peripherally disposed around said indexing peg.

7. An electrical component according to claim 1, wherein said indexing peg comprises a magnetic material.

8. An electrical component according to claim 1, wherein said indexing peg is detachably secured to said selected surface.

9. An electrical component according to claim 8, wherein said indexing peg is secured to said selected surface by a dissolvable adhesive.

10. An electrical component according to claim 8, wherein said indexing peg is secured to said selected surface by an adhesive which weakens to allow separation of said indexing peg from said selected surface when said adhesive is heated to a given temperature.

11. An electrical component according to claim 1, wherein said indexing peg comprises a material which disintegrates when heated to a predetermined temperature.

12. An electrical component according to claim 1, wherein said indexing peg comprises a material of good thermal conductivity.

13. An electrical component according to claim 1, wherein said indexing peg comprises an insulating material having a metallic layer disposed on the surface of the indexing peg.

14. An electrical component according to claim 1, wherein said indexing peg comprises a low melting point metal selected from the group consisting of lead, tin, lead-tin alloys, Lows metal and Wood's metal.

15. An electrical component according to claim 1, wherein said electrodes are disposed on the surface of said die opposite said selected surface.

16. Apparatus for processing electrical components, each said component including (i) a die having a number of operating regions, (ii) a plurality of conductive terminal pads on the die, each pad being electrically coupled to at least one of said active regions, and (iii) an indexing protuberance extending from one major surface of the die, said protuberance having (a) a base portion of non-circular cross section secured to said major face and aligned with said terminal pads and (b) a tapered end portion, comprising:

a member having a hole therein for indexedly receiving each of said devices; and means for transferring at least selected ones of said devices to said member in response to a control signal, so that the protuberance of each selected device retains said selected device in indexed relationship with said hole.

17. Apparatus according to claim 16, further comprising:

means, including conductors contacting said terminal pads, for electrically testing each of said devices; and means, responsive to said testing means, for generating said control signal.

18. Apparatus according to claim 16, further comprising:

a substrate having at least one aperture therein for indexedly receiving a corresponding one of said devices;

means for bringing said member into juxtaposition with said substrate so that a selected one of said holes is adjacent said aperture; and means responsive to said juxtaposition for transferring said corresponding device from said selected hole to said aperture.

19. Apparatus according to claim 18, wherein said substrate has a corresponding plurality of contact areas adjacent said aperture, and each of said terminal pads is brought into registration with a corresponding one of said contact areas by the indexing of said base portion in said aperture.

20. Apparatus according to claim 19, further comprising means for bonding each of said terminal pads to a corresponding one of said contact areas.

21. Apparatus according to claim 20, wherein said terminal pads and corresponding contact areas are soft solderable, said peg includes a conductive portion, and said bonding means includes means for coupling radio frequency energy to said conductive portion to cause heating of said device so that any solder in contact with said terminal pads is melted.

22. Apparatus according to claim 18, wherein said terminal pads are disposed on the other major surface of said die, further comprising:

an electrical subassembly adjacent said substrate, said subassembly having a corresponding plurality of contact areas in registration with the part of said substrate peripheral to said aperture;

means for bringing said subassembly and said substrate into juxtaposition so that each terminal pad of said corresponding device is contiguous with a corresponding one of said contact areas; and means for bonding each of said corresponding device terminal pads to the corresponding one of said contact areas.

References Cited

UNITED STATES PATENTS

| | | | |
|---|---|---|---|
| 2,918,640 | 12/1959 | Higgs. | |
| 3,213,325 | 10/1965 | Lindstrand. | |
| 3,249,908 | 5/1966 | Fuller et al. | |
| 3,286,132 | 11/1966 | Turner. | |
| 3,289,045 | 11/1966 | Pritikin et al. | |
| 3,292,240 | 12/1966 | McNutt et al. | 29—577 |
| 3,418,422 | 12/1968 | Bradham. | |
| 3,027,526 | 3/1962 | La Patka et al. | 317—101 XR |

ROBERT K. SCHAEFER, Primary Examiner

J. R. SCOTT, Assistant Examiner

U.S. Cl. X.R.

29—577; 174—68.5; 339—17